(12) United States Patent
Tsukamoto et al.

(10) Patent No.: US 9,831,646 B2
(45) Date of Patent: Nov. 28, 2017

(54) WIRE PROTECTION MEMBER

(71) Applicant: Yazaki Corporation, Minato-ku, Tokyo (JP)

(72) Inventors: Masashi Tsukamoto, Makinohara (JP); Masataka Yamamoto, Makinohara (JP); Tomoyuki Sugawara, Makinohara (JP)

(73) Assignee: Yazaki Corporation, Minato-ku, Tokyo (JP)

( * ) Notice: Subject to any disclaimer, the term of this patent is extended or adjusted under 35 U.S.C. 154(b) by 0 days.

(21) Appl. No.: 15/054,835

(22) Filed: Feb. 26, 2016

(65) Prior Publication Data

US 2016/0181776 A1 Jun. 23, 2016

Related U.S. Application Data

(63) Continuation of application No. PCT/JP2014/072197, filed on Aug. 25, 2014.

(30) Foreign Application Priority Data

Aug. 27, 2013 (JP) .................................. 2013-175639

(51) Int. Cl.
*H02G 3/04* (2006.01)
*B60R 16/02* (2006.01)
(Continued)

(52) U.S. Cl.
CPC ....... *H02G 3/0468* (2013.01); *B60R 16/0215* (2013.01); *H02G 3/32* (2013.01); *H02G 3/34* (2013.01)

(58) Field of Classification Search
USPC ........................................................ 174/68.3
See application file for complete search history.

(56) References Cited

U.S. PATENT DOCUMENTS

| 4,386,752 A | 6/1983 | Pavlak et al. |
| 6,395,986 B1 * | 5/2002 | Gust .................... H02G 3/0468 16/2.1 |

(Continued)

FOREIGN PATENT DOCUMENTS

| CN | 202972213 U | 6/2013 |
| JP | S62-115723 U | 7/1987 |

(Continued)

OTHER PUBLICATIONS

Sep. 30, 2014—International Search Report—Intl App PCT/JP2014/072197.

(Continued)

*Primary Examiner* — Dhirubhai R Patel
(74) *Attorney, Agent, or Firm* — Banner & Witcoff, Ltd.

(57) ABSTRACT

A wire protection member includes: a flexible cylindrical wire protection tube, in which a plurality of large diameter portions and a plurality of small diameter portions are arranged alternately such that concave outer circumferential grooves are formed between adjacent ones of the large diameter portions across the corresponding small diameter portion; and a connection member in which a connection portion and a locking tool are formed integrally. The connection portion connects a plurality of annular portions formed in a plurality of the outer circumferential grooves respectively by molding. The locking tool is allowed to be locked to a mounting hole of a vehicle body panel.

4 Claims, 12 Drawing Sheets

(51) Int. Cl.
  *H02G 3/32* (2006.01)
  *H02G 3/34* (2006.01)

(56) References Cited

U.S. PATENT DOCUMENTS

| | | | |
|---|---|---|---|
| 6,875,918 B2* | 4/2005 | Sudo | H02G 3/06 138/108 |
| 8,507,794 B2* | 8/2013 | Wada | H02G 3/32 174/135 |
| 2014/0027147 A1 | 1/2014 | Yamamoto et al. | |
| 2015/0270690 A1 | 9/2015 | Yamamoto et al. | |
| 2015/0270692 A1 | 9/2015 | Yamamoto et al. | |

FOREIGN PATENT DOCUMENTS

| | | |
|---|---|---|
| JP | S62-165716 U | 10/1987 |
| JP | H06-070425 A | 3/1994 |
| JP | H06-245347 A | 9/1994 |
| JP | H10-98819 | 4/1998 |
| JP | 2006-149012 A | 6/2006 |
| JP | 2012-085439 A | 4/2012 |
| JP | 2012-217295 A | 11/2012 |

OTHER PUBLICATIONS

Mar. 1, 2016—(WO) IPRP—App PCT/JP2014/072197.
Jan. 4, 2017—(CN) Notification of the First Office Action—App 201480042482.5.
May 10, 2017—(CN) The Second Office Action—App 201480042482.5.
Jun. 13, 2017—Notification of Reasons for Refusal—App 2013-175639.

* cited by examiner

WIRE PROTECTION MEMBER

CROSS REFERENCE TO RELATED APPLICATION(S)

This application is a continuation of PCT application No. PCT/JP2014/072197, which was filed on Aug. 25, 2014 based on Japanese Patent Application (No. 2013-175639) filed on Aug. 27, 2013, the contents of which are incorporated herein by reference.

BACKGROUND OF THE INVENTION

1. Field of the Invention

The present invention relates to a wire protection member.

2. Description of the Related Art

A wire protection tube for preventing electric wires from touching another member to be thereby damaged is used in a wire harness provided in a car or the like. A locking tool to be locked to a mounting hole of a vehicle body panel where the electric wires should be wired is bound to an outer circumferential surface of the wire protection tube made of a synthetic resin material and having flexibility. However, the wire protection tube may be crushed at the place where the locking tool is bound with a binding band or the like. The electric wires may be bitten at the place where the wire protection tube is crushed. In addition, there arises a problem that a space to receive the electric wires may be reduced at the crushed place to thereby deteriorate the wire protection function.

Therefore, there has been proposed a protection tube with a locking tool, in which a locking tool that can be locked to a mounting hole of a vehicle body panel is formed integrally with a wire protection tube (see JP-A-2012-217295).

As shown in FIG. 12, a wire harness 501 includes a protection tube 503 with a locking tool. In the protection tube 503 with a locking tool, a locking tool 507 to be locked to a mounting hole of a vehicle body panel where electric wires 505 should be wired is provided on the outer circumferential surface of a protection tube (wire protection tube) 511 formed into a cylindrical shape and receiving a wire bundle 509.

According to the protection tube 503 with a locking tool, the locking tool 507 is formed integrally with the protection tube 511. It is therefore unnecessary to bind the locking tool to the protection tube with a binding band as described above. Therefore, there is no fear that the protection tube 511 may be crushed due to binding with the binding band.

SUMMARY OF THE INVENTION

However, in the aforementioned background-art protection tube 503 with a locking tool, as shown in FIG. 12, the outer circumferential surface of the protection tube 511 is covered with a cylindrical portion 513 formed into a cylindrical shape. The protection tube 511 made of synthetic resin has flexibility (easy bendability) due to its configuration in which a plurality of large diameter portions 515 and a plurality of small diameter portions 517 are arranged alternately. However, of the cylindrical portion 513 provided on the outer circumferential surface of the protection tube 511, parts formed on the inner side are filled into concave outer circumferential grooves 519 located between adjacent ones of the large diameter portions 515 across each small diameter portion 517. Thus, the parts formed on the inner side are integrated with the protection tube 511. Therefore, flexibility is lost in the site of the protection tube 511 where the cylindrical portion 513 is formed integrally. On the other hand, a load of the wire harness 501 is applied to the site of the protection tube 511 where the locking tool 507 is provided. Therefore, there is a request to prevent decrease in rigidity in the site.

The present invention has been developed in consideration of the aforementioned circumstances. An object of the invention is to provide a wire protection member capable of keeping flexibility of a wire protection tube without lowering rigidity of the wire protection tube.

The aforementioned object of the invention is attained by the following configurations.

(1) A wire protection member including: a flexible cylindrical wire protection tube, in which a plurality of large diameter portions and a plurality of small diameter portions are arranged alternately such that concave outer circumferential grooves are formed between adjacent ones of the large diameter portions across the corresponding small diameter portion; and a connection member in which a connection portion and a locking tool are formed integrally, wherein the connection portion connects a plurality of annular portions formed in a plurality of the outer circumferential grooves respectively by molding, and wherein the locking tool is allowed to be locked to a mounting hole of a vehicle body panel.

According to the wire protection member having the aforementioned configuration (1), a plurality of annular portions are formed in a plurality of outer circumferential grooves of the wire protection tube by molding, so as to firmly adhere to the outer circumferential grooves respectively. Only parts of circumferences of the annular portions are connected by the connection portion, while most of the circumferences of the annular portions are separated from one another. The parts where the annular portions are formed in the outer circumferential grooves of the wire protection tube by molding becomes so thick and hence so high in rigidity that the wire protection tube can be prevented from being crushed easily. On the other hand, most of the annular portions adjacent to each other in the axial direction of the wire protection tube are separated from each other. Therefore, the large diameter portions put between the annular portions are not easily restrained from expanding and contracting (particularly tensile deformation or compressive deformation) in the axial direction. As a result, the large diameter portions can undergo tensile deformation or compressive deformation even in a site where the annular portions are formed in the outer circumferential grooves adjacent to each other by molding. Thus, there is no fear that the flexibility of the wire protection tube may be lost.

(2) A wire protection member according to the aforementioned configuration (1), wherein the plurality of annular portions are formed in at least alternate ones of the outer circumferential grooves by molding.

According to the wire protection member having the aforementioned configuration (2), the plurality of annular portions are formed in at least alternate ones of the outer circumferential grooves by molding such that at least one small diameter portion put between a pair of large diameter portions is disposed between adjacent ones of the annular portions. Accordingly, the small diameter portions can also undergo compressive deformation in addition to the compressive deformation of the large diameter portions. As a result, the wire protection tube can obtain higher flexibility in comparison with the case in which annular portions are formed by molding in all the outer circumferential grooves of the region where the annular portions are formed.

(3) A wire protection member according to the aforementioned configuration (1) or (2), wherein an outer diameter of each of the annular portions is smaller than an outer diameter of each of the large diameter portions.

According to the wire protection member having the aforementioned configuration (3), the annular portions of the connection member do not project over the outer circumferential surface of the large diameter portions of the wire protection tube but become compact. Accordingly, when the wire protection member in which electric wires have been inserted into the wire protection tube is attached to the vehicle body panel, the annular portions of the wire protection member do not interfere with any other member. Thus, it is possible to enhance the degree of freedom in the layout with which the wire harness can be wired.

(4) A wire protection member according to any one of the aforementioned configurations (1) to (3), wherein a slit is formed in a direction along an axis of the wire protection tube and axes of the annular portions such that an electric wire is inserted through the slit.

According to the wire protection member having the aforementioned configuration (4), due to the annular portions of the connection member formed in only the outer circumferential grooves of the wire protection tube by molding, the slit can be opened easily in comparison with a cylindrical portion in a background-art protection tube with a locking tool. Accordingly, due to the annular portions of the connection member, the rigidity can be enhanced to prevent the wire protection tube from being crushed easily while there is no fear that the workability with which an electric wire is inserted through the slit may be lost.

According to a wire protection member according to the invention, the flexibility of a wire protection tube can be kept without lowering the rigidity of the wire protection tube.

The invention has been described briefly. Further, the details of the invention will be made clearer through the following mode for carrying out the invention (hereinafter referred to as "embodiment") with reference to the accompanying drawings.

DETAILED DESCRIPTION OF THE EXEMPLARY EMBODIMENTS

Embodiments of the invention will be described below with reference to the drawings.

Figure 1:
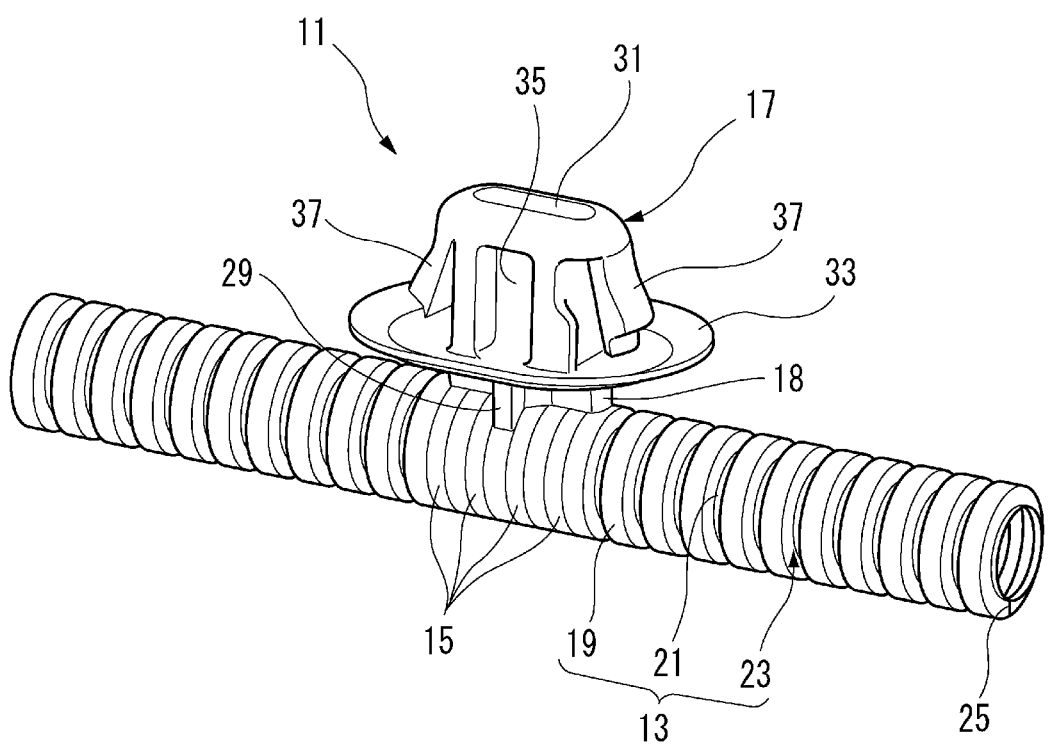
FIG. 1 is a perspective view of a wire protection member according to a first embodiment of the invention.
Figure 2:
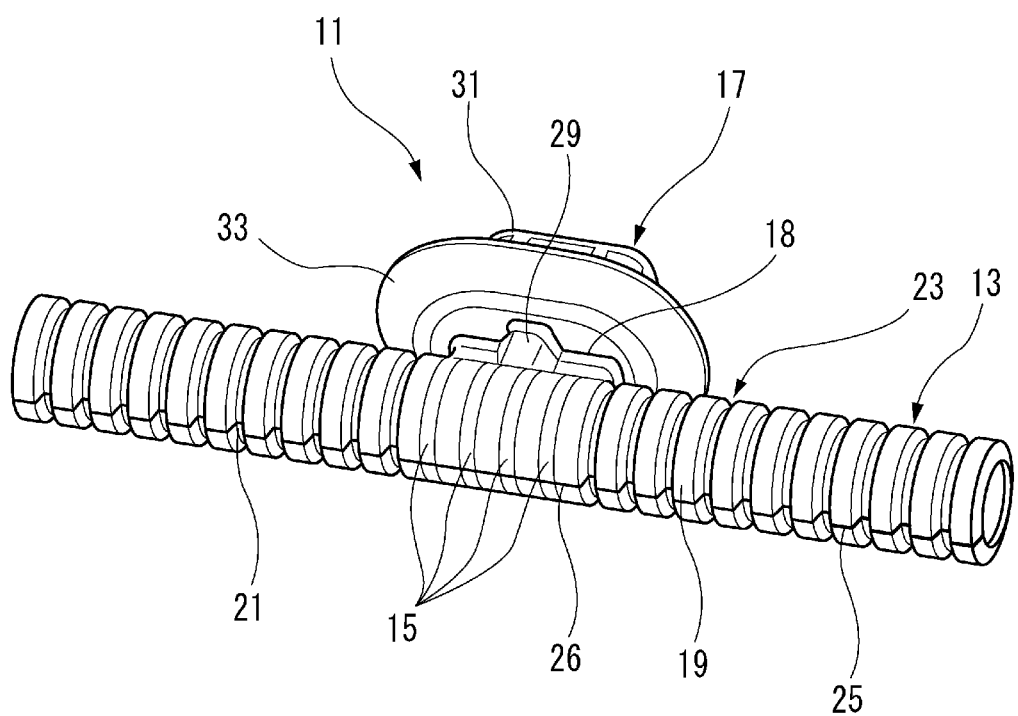
FIG. 2 is a perspective view in which the wire protection member shown in FIG. 1 is observed from the opposite side to a locking tool.

As shown in FIG. 1 and FIG. 2, a wire protection member 11 according to a first embodiment of the invention includes a wire protection tube 13 and a connection member 17.

The wire protection tube 13 is made of a synthetic resin material. The wire protection tube 13 has flexibility in terms of material and structure. In the wire protection tube 13, a plurality of large diameter portions 19 and a plurality of small diameter portions 21 are arranged alternately so that concave outer circumferential grooves 23 can be formed between adjacent ones of the large diameter portions 19 across each of the small diameter portions 21. Thus, the wire protection tube 13 is formed into a cylindrical shape with flexibility. That is, each of the large diameter portions 19 and the small diameter portions 21 can be elastically deformed in terms of material, while side wall portions 22 of the outer circumferential grooves 23 formed between the large diameter portions 19 and the small diameter portions 21 are vulnerable to a bending load. Thus, the wire protection tube 13 also has flexibility in terms of structure. A so-called corrugated tube is suitably used as the wire protection tube 13.

In the wire protection tube 13 according to the embodiment, a slit 25 (see FIG. 2) through which electric wires (not shown) can be inserted is formed along the axis of the wire protection tube 13. Not to say, the wire protection member according to the embodiment may be also used in a case where no slit is provided in the wire protection tube.

In the connection member 17, a connection portion 18 and a locking tool 31 are formed integrally. The connection portion 18 connects a plurality of annular portions 15 formed in a plurality of outer circumferential grooves 23 of the wire protection tube 13 respectively by molding. The locking tool 31 is locked to a mounting hole of a vehicle body panel (not shown). In the embodiment, a slit 26 is also formed in each annular portion 15 of the connection member 17 because the slit 25 is formed in the wire protection tube 13. That is, the annular portion 15 can be formed and opened into a C-shape due to the slit 26. The connection member 17 is put into a forming mold 27 (see FIG. 7), which will be described later, together with the wire protection tube 13 so as to be formed by molding. Incidentally, it is preferable that the number of annular portions 15 formed integrally with the connection member 17 is at least two. Even when the connection member 17 has only one annular portion 15, the locking tool 31 can be formed integrally with the connection member 17. In that case, however, the effect for enhancing the rigidity of the wire protection tube 13 is reduced.

The connection portion 18 is formed integrally with the annular portions 15. The connection portion 18 connects the plurality of annular portions 15. According to the first embodiment, the annular portions 15 are formed into erect walls projecting outward in the radial direction of the wire protection tube 13 and extending along the axis of the wire protection tube 13. That is, the plurality of annular portions 15 are connected to the connection portion 18 by a slight circumferential distance. Reinforcing ribs 29 are provided in the opposite side surfaces of the connection portion 18 so as to protrude vertically. The connection portion 18 and the reinforcing ribs 29 form a cross shape in horizontal section. The lower ends of the reinforcing ribs 29 are fixedly attached to parts of the outer circumferences of the large diameter portions 19.

According to the first embodiment, the plurality (four in the embodiment) of annular portions 15 are formed in adjacent four of the outer circumferential grooves 23 by molding. That is, the annular portions 15 are provided in all the outer circumferential grooves 23 in the region where the annular portions are formed. Incidentally, the plurality of annular portions 15 may be formed in at least alternate ones of the outer circumferential grooves 23 by molding.

The locking tool 31 such as a clip is formed integrally with the connection member 17. In the embodiment, the locking tool 31 includes an abutment plate 33, a shaft portion 35 and a pair of locking claws 37. The abutment plate 33 abuts against the circumferential edge of a mounting hole provided in a vehicle body panel (not shown). The shaft portion 35 protrudes vertically from the abutment plate 33. The locking claws 37 are open from the distal end side of the shaft portion 35 toward the abutment plate 33. In the locking tool 31, the abutment plate 33 is formed integrally with the upper end of the connection portion 18.

In the locking tool 31, the pair of locking claws 37 are closed, and the shaft portion 35 is inserted into the mounting hole of the vehicle body panel. When the abutment plate 33 abuts against the vehicle body panel, the pair of locking claws 37 are opened on the back side of the vehicle body panel so that the vehicle body panel can be put between the locking claws 37 and the abutment plate 33. Thus, the locking tool 31 is locked to the vehicle body panel.

Figure 3:
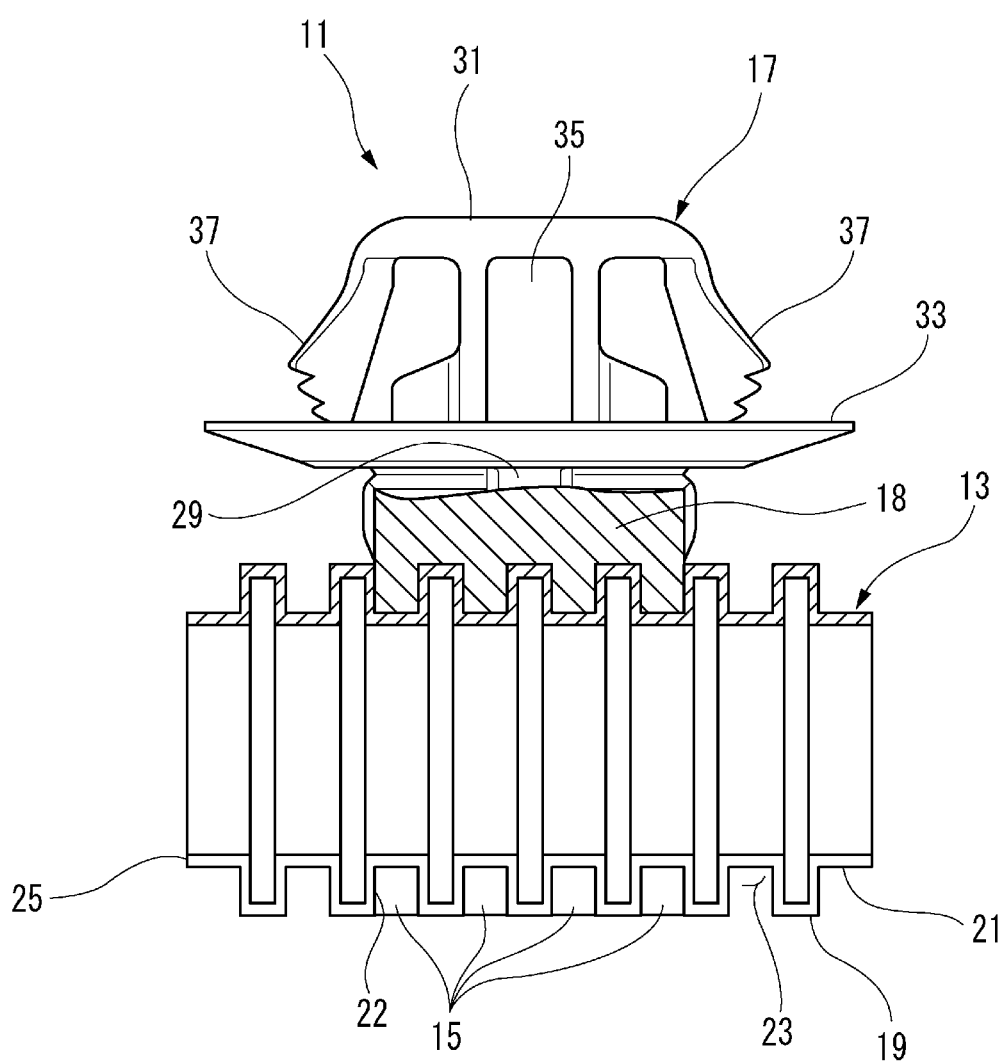
FIG. 3 is an enlarged side view in which a part of the wire protection member shown in FIG. 1 is cut away.

As shown in FIG. 3, each of the annular portions 15 in the connection member 17 according to the first embodiment is formed substantially with the same diameter as each of the large diameter portions 19 of the wire protection tube 13. The annular portions 15 and the connection portion 18 in the connection member 17 and the locking tool 31 are formed integrally out of one and the same molding resin material. Accordingly, the side surfaces and the inner circumferential surfaces of the annular portions 15 of the connection member 17 firmly adhere to the side wall portions 22 of the outer circumferential grooves 23 and the outer circumferential portions of the small diameter portions 21. In addition, the lower surface (the surface on the lower side in FIG. 3) of the connection portion 18 of the connection member 17 firmly adheres to the outer circumferential portions of the large diameter portions 19. According to this configuration, the annular portions 15 in the connection member 17 can be formed not to protrude from the outer circumference of the wire protection tube 13.

Figure 4:
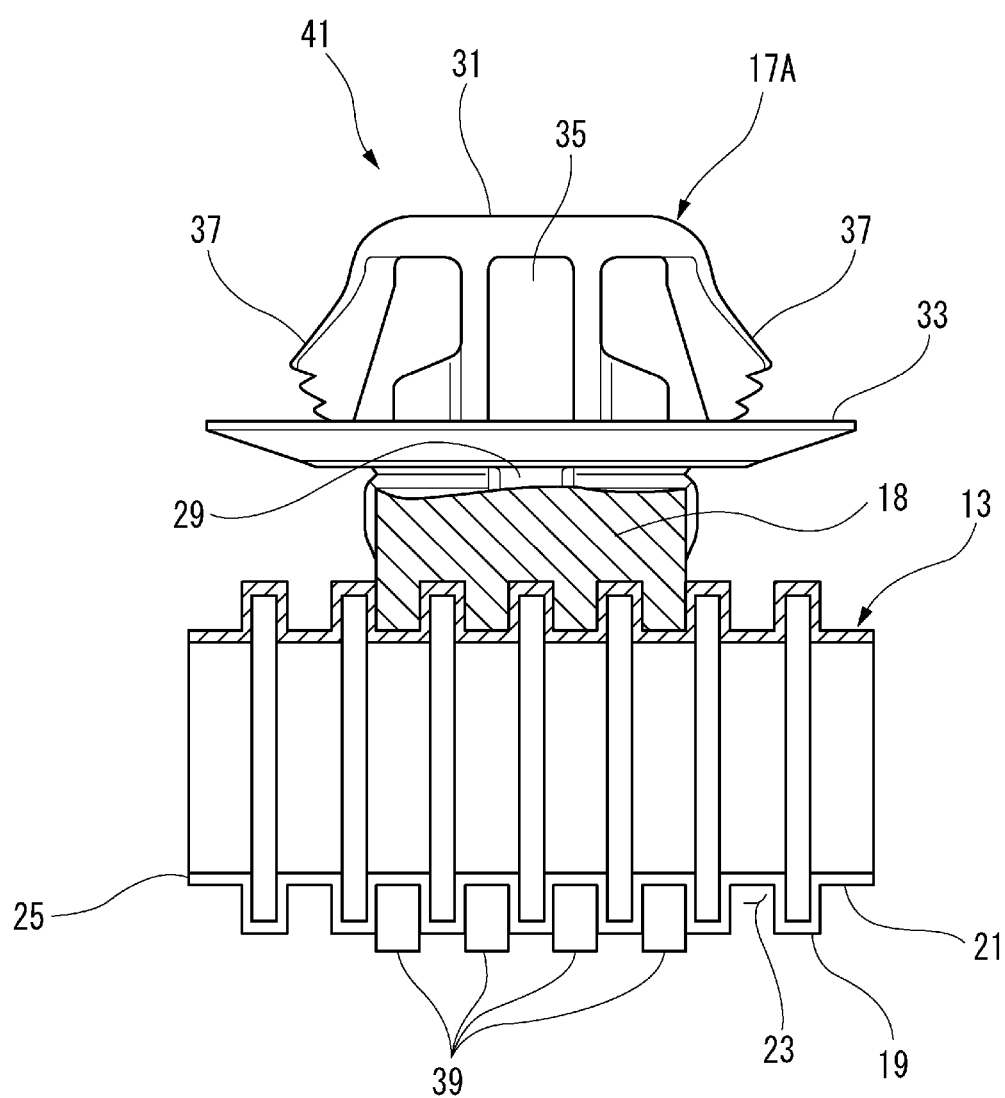
FIG. 4 is an enlarged side view in which a part of a wire protection member according to a modification is cut away, the wire protection member including a connection member with annular portions whose diameters are larger than large diameter portions of a wire protection tube.

Incidentally, as in a wire protection member 41 according to a modification shown in FIG. 4, the outer diameter of each annular portion 39 in a connection member 17A may be formed to be larger than the outer diameter of each large diameter portion 19 of a wire protection tube 13. In this case, a connection portion 18 of the connection member 17A is connected to only the annular portions 39 and separated from the large diameter portions 19. According to this configuration, the wire protection member 41 can be bent easily as compared with a structure in which the connection portion 18 is fixedly attached to the large diameter portions 19. In addition, when a large sectional area is secured in each annular portion 39, the rigidity can be enhanced.

Figure 5:
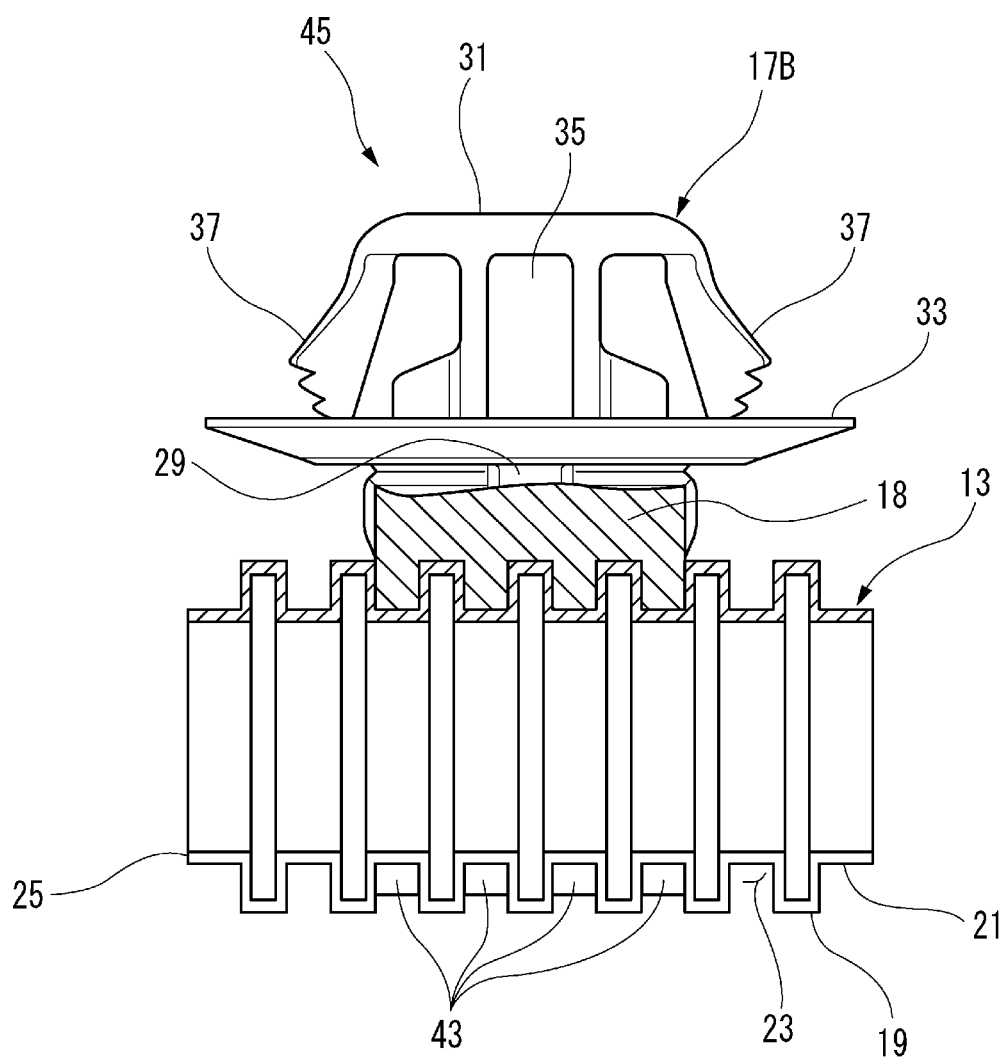
FIG. 5 is an enlarged side view in which a part of a wire protection member according to a second embodiment of the invention is cut away.

Further, as in a wire protection member 45 according to a second embodiment of the invention shown in FIG. 5, the outer diameter of each annular portion 43 in a connection member 17B may be formed to be smaller than the outer diameter of each large diameter portion 19 of a wire protection tube 13. According to this configuration, the area with which the annular portions 43 firmly adhere to outer circumferential grooves 23 can be reduced. As a result, the wire protection member 45 can be bent easily as compared with the aforementioned wire protection member 11 or 41 in which the annular portions 15 or 39 are fixedly attached to the outer circumferential grooves 23. In addition, the annular portions 43 are smaller in volume than the annular portions 15 or 39. It is therefore possible to make the wire protection member 45 light in weight.

Accordingly, when the outer diameter of each annular portion 15 is formed to be substantially as large as the outer diameter of each large diameter portion 19 of the wire protection tube 13 or the outer diameter of each annular portion 43 is formed to be smaller than the outer diameter of each large diameter portion 19 as in the connection member 17 or 17B in the aforementioned wire protection member 11 or the aforementioned wire protection member 45, the annular portions 15 or 43 do not project over the outer circumferential surfaces of the large diameter portions 19 of the wire protection tube 13 but can be made compact. Therefore, when the wire protection member 11 or the wire protection member 45 in which electric wires have been inserted into the wire protection tube 13 is attached to the vehicle body panel, the annular portions 15 or 43 in the wire protection member 11 or 45 do not interfere with any other member but it is possible to enhance the degree of freedom in the layout with which the wire harness can be wired.

Next, a method for manufacturing the aforementioned wire protection member 11 will be described.

Figure 6:
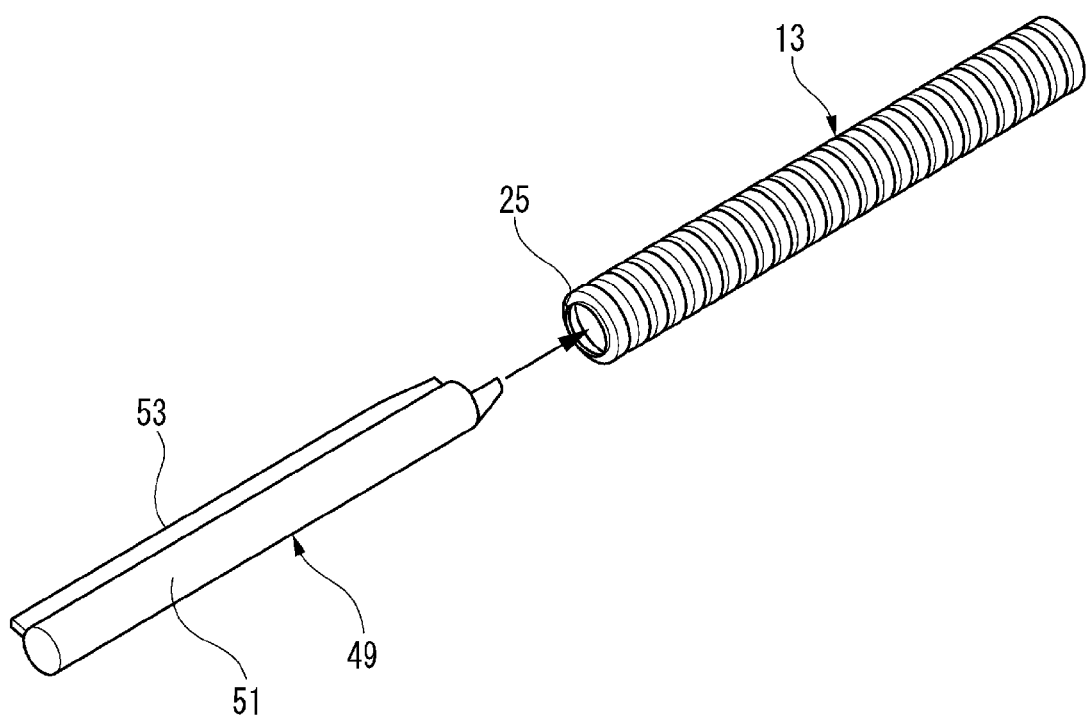
FIG. 6 is a perspective view of a wire protection tube and a core.

As shown in FIG. 6, in order to form the aforementioned wire protection member 11, a core 49 is first inserted into the wire protection tube 13.

The core 49 includes a shaft body 51 and an insertion plate 53. The shaft body 51 has a diameter substantially the same as the inner diameter of the wire protection tube 13 so that the shaft body 51 can be inserted into the wire protection tube 13. The insertion plate 53 projects over the outer circumference of the shaft body 51 and in a direction along the axis of the shaft body 51. In the core 49, the shaft body 51 is inserted into the wire protection tube 13 that has not been set in the forming mold 27 yet, while the insertion plate 53 is inserted into the slit 25. Thus, the wire protection tube 13 can be prevented from being crushed due to the injection pressure of molding resin reaching a high temperature. In addition, when the insertion plate 53 projecting over the wire protection tube 13 is disposed in an insertion plate receiving portion 55 (see FIG. 7 and FIG. 8) of the forming mold 27, the relative position between the slit 25 and the locking tool 31 in the molded product can be decided.

Figure 7:
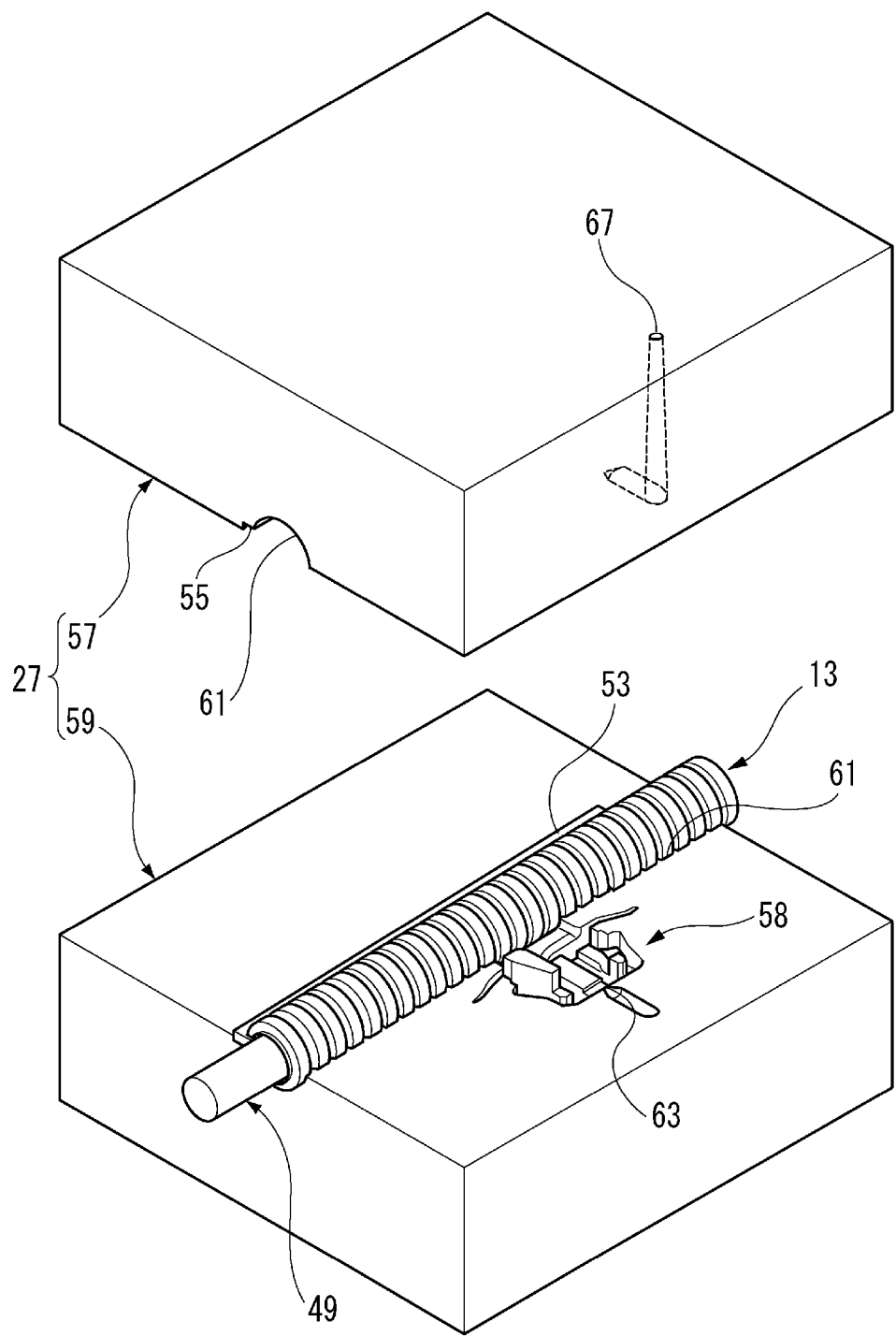
FIG. 7 is a perspective view showing a mold opening state of a forming mold in which the wire protection tube and the core have been set in a lower mold.

As shown in FIG. 7, the forming mold 27 includes an upper mold 57 and a lower mold 59, which are made of synthetic resin. The wire protection tube 13 to which the core 49 has been inserted is disposed in a wire protection tube receiving portion 61 between the upper mold 57 and the lower mold 59. The upper mold 57 and the lower mold 59 are clamped by a mold clamping device while setting the wire protection tube 13 therebetween. Therefore, a cavity 58 corresponding to the annular portions 15, the connection portion 18 and the locking members 31 is disposed between the wire protection tube 13 disposed inward and the inner surface of the wire protection tube receiving portion 61. In this state, molten thermoplastic resin is injected from a supply path 67 of the upper mold 57 to the cavity 58 through a gate 63. When a predetermined amount of thermoplastic resin is supplied, the cavity 58 is filled with the thermoplastic resin. The thermoplastic resin is hardened. Thus, the connection member 17 having an external shape corresponding to the inner surface shape of the cavity 58 and provided with the annular portions 15, the connection portion 18 and the locking tool 31 can be formed on the outer circumference of the wire protection tube 13 by molding.

Figure 8:
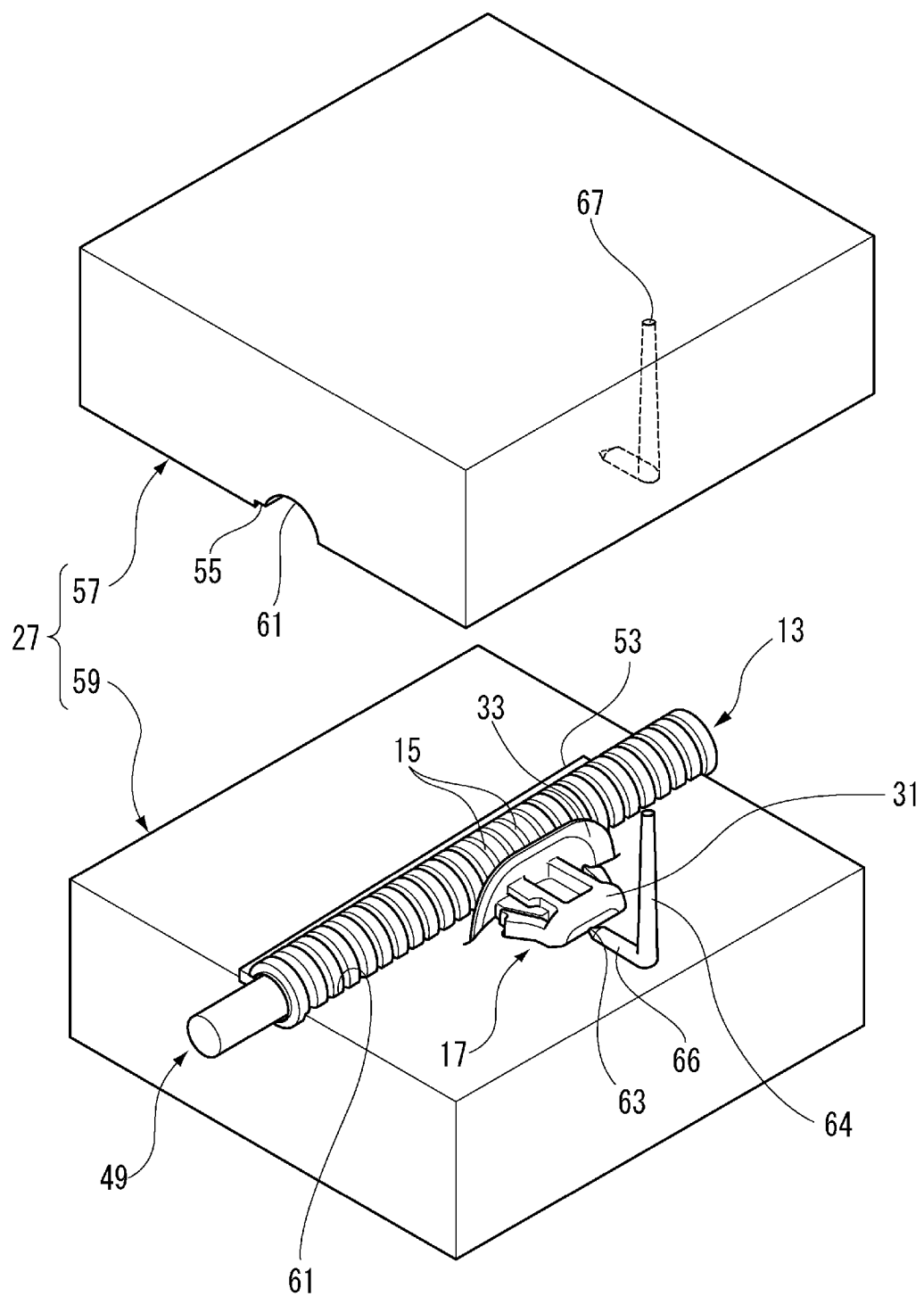
FIG. 8 is a perspective view of a mold opening state of the forming mold in which the wire protection member has been formed.

Then, as shown in FIG. 8, the upper mold 57 and the lower mold 59 of the forming mold 27 are opened, and the molded product is extracted therefrom. A sprue 64 and a runner 66 are removed from the gate 63. Thus, manufacturing the wire protection member 11 is completed.

Figure 9:
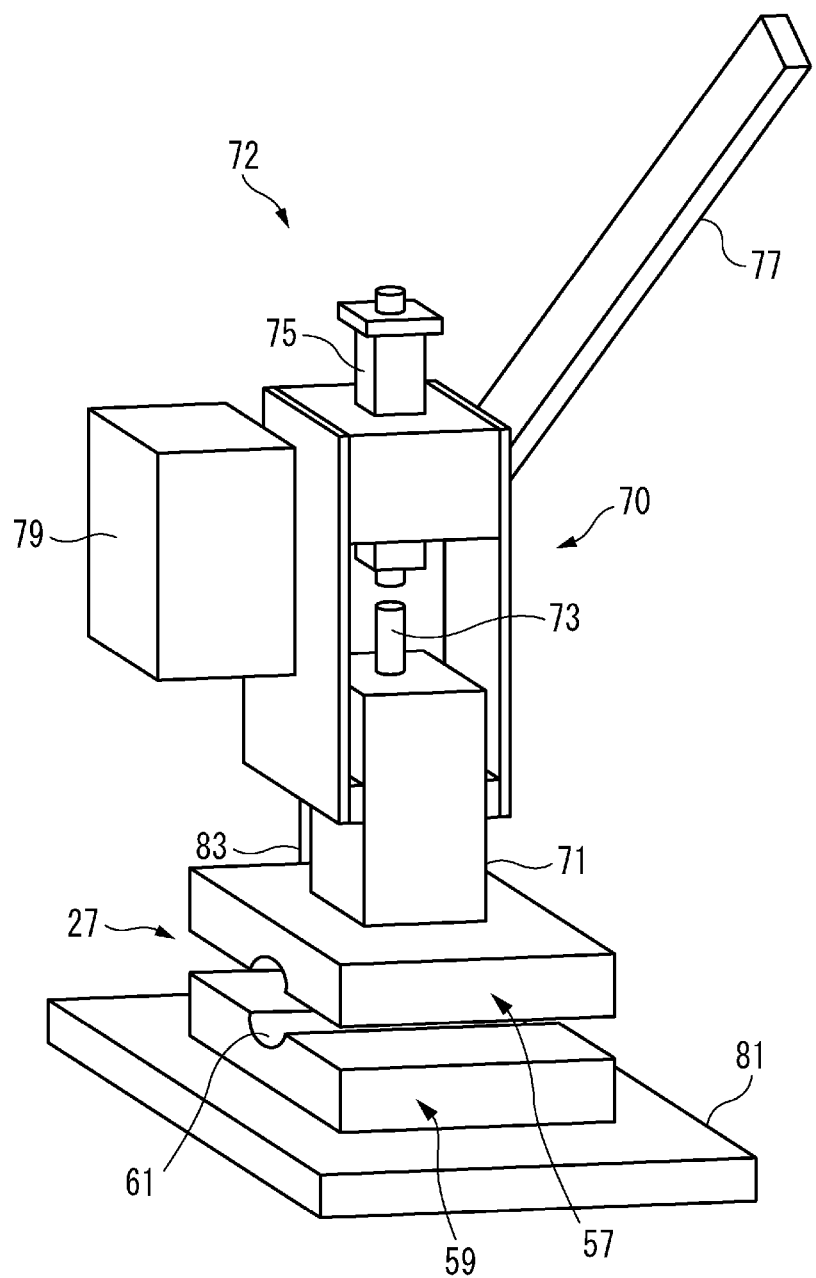
FIG. 9 is a perspective view of a micro molding machine.

Using a micro molding machine 72 shown in FIG. 9, the thermoplastic resin is injected into the cavity 58 inside the forming mold 27. The micro molding machine 72 is a resin molding machine that can be operated by one worker without using external power such as an electric motor. The micro molding machine 72 includes a mold clamping device (not shown) and a low pressure injection device 70. The upper mold 57 and the lower mold 59 are opened and closed by the mold clamping device. Molten resin is pressurized and injected into the forming mold 27 by the lower pressure injection device 70.

The low pressure injection device 70 includes a heating cylinder 71, a plunger 73, an injection cylinder 75, a handle 77 and a temperature controller 79, which are supported by a support 83 erectly provided on a pedestal 81. The heating cylinder 71 is provided with a heater for heating and melting synthetic resin such as polypropylene or the like. The plunger 73 injects the molten resin of the heating cylinder 71 from a not-shown nozzle. The injection cylinder 75 advances the plunger 73. The handle 77 drives the injection cylinder 75. The temperature controller 79 keeps the heating temperature of the heating cylinder 71 at a desired temperature.

Incidentally, according to the micro molding machine 72 referred to in the embodiment, resin can be molded up to an amount of about several tens of grams every shot of injection molding, and the forming mold 27 can be closed using an air cylinder, a link, etc. or manually. Incidentally, the low pressure injection device 70 may drive the injection cylinder 75 using external power such as an electric motor or an air. More specifically, a well-known "injection molding apparatus", for example, disclosed in JP-A-2010-260297, JP-A-2012-30429, JP-A-2013-103492, etc. may be used as the micro molding machine 72.

The forming mold 27 in the embodiment is disposed on the pedestal 81. In the forming mold 27, the upper mold 57 and the lower mold 59 are combined to put the wire protection tube 13 therebetween so that the wire protection tube 13 can be received in the wire protection tube receiving portion 61. Thus, the cavity 58 serves as a cavity capable of molding. Then, molten thermoplastic resin is supplied to the cavity from the supply path 67 through the sprue 64, the runner 66 and the gate 63. Thus, the connection member 17 is formed on the outer circumference of the wire protection tube 13 by injection molding, and the wire protection member 11 is formed.

Incidentally, although the embodiment has been described on the assumption that the forming mold 27 is a horizontal split mold, the forming mold 27 may be a vertical split mold.

Next, the operation of the wire protection member 11 having the aforementioned configuration will be described.

In the wire protection member 11 according to the first embodiment, a plurality of annular portions 15 are formed by molding in a plurality of outer circumferential grooves 23 of a wire protection tube 13 so as to firmly adhere thereto respectively. Only parts of circumferences of the annular portions 15 are connected by a connection portion 18, while most of the circumferences of the annular portions 15 are separated from one another. The parts where the annular portions 15 are formed in the wire protection tube 13 (that is, the outer circumferential grooves 23) become so thick and hence so high in rigidity that the wire protection tube 13 can be prevented from being crushed easily.

Figure 10A:
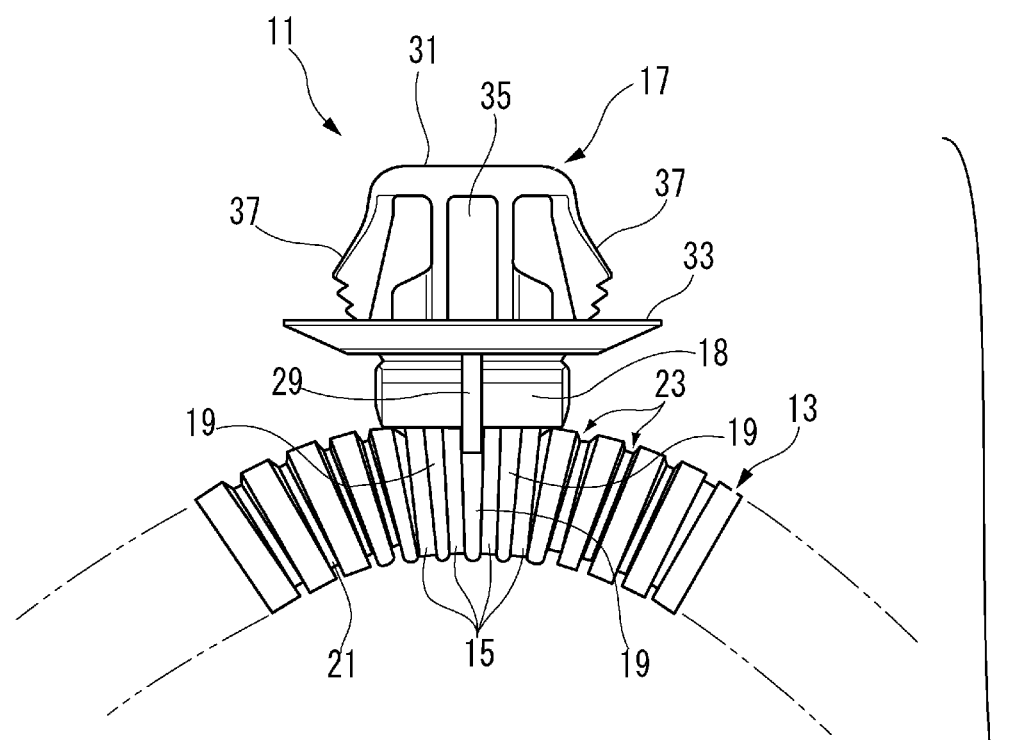
FIG. 10A is a view for explaining the operation of the wire protection member in which the wire protection tube has been bent to be convex upward.
Figure 10B:
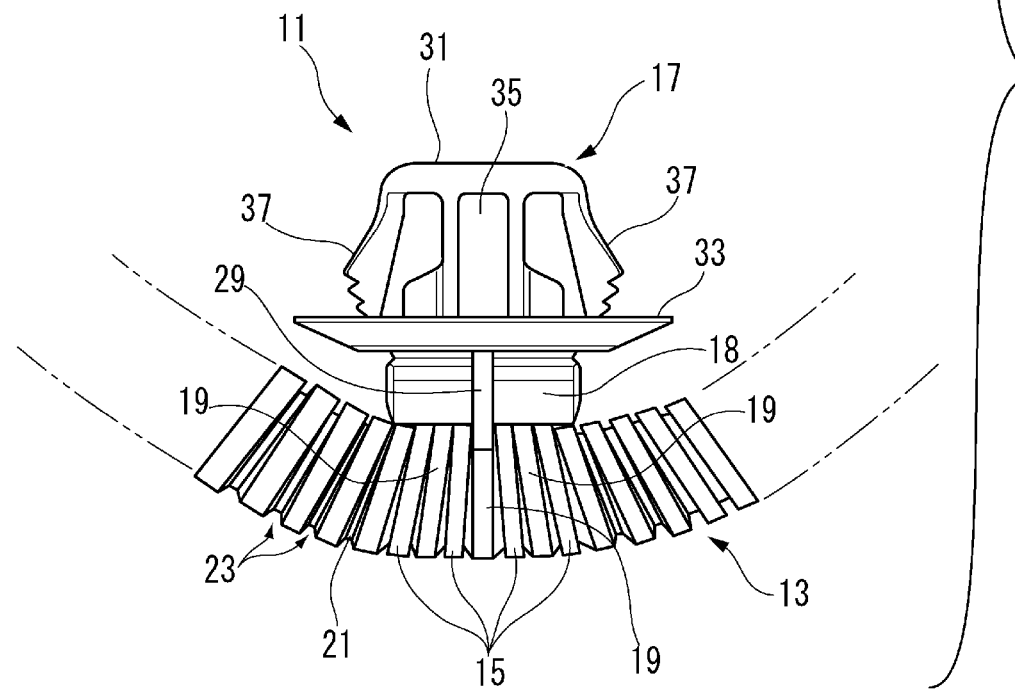
FIG. 10B is a view for explaining the operation of the wire protection member in which the wire protection tube has been bent to be convex downward.

On the other hand, most of the annular portions 15 adjacent to each other in the axial direction of the wire protection tube 13 are separated from each other. Therefore, the large diameter portions 19 put between the annular portions 15 are not easily restrained from expanding and contracting (particularly tensile deformation or compressive deformation) in the axial direction. As a result, as shown in FIG. 10A, even in a site where the annular portions 15 are formed in the outer circumferential grooves 23 adjacent to each other so as to firmly adhere thereto by molding, the large diameter portions 19 can undergo compressive deformation on their lower side when the wire protection tube 13 is bent to be convex upward. Thus, there is no fear that the flexibility of the wire protection tube 13 may be lost. On the other hand, as shown in FIG. 10B, when the wire protection tube 13 is bent to be convex downward, the large diameter portions 19 can also undergo tensile deformation on their lower side. Thus, there is no fear that the flexibility of the wire protection tube 13 may be lost.

Figure 12:
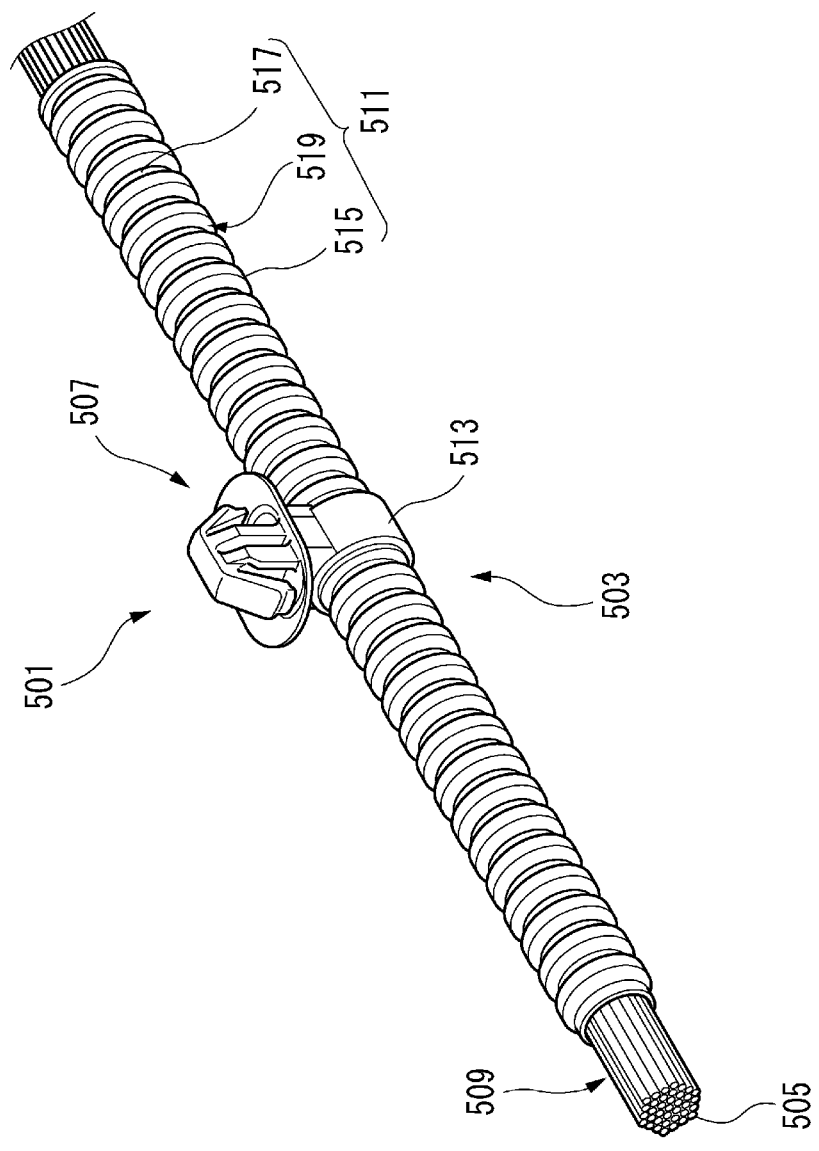
FIG. 12 is a perspective view of a protection tube with a locking tool in the background art.

In addition, in the wire protection member 13 according to the embodiment, the slit 25 to which electric wires can be inserted is formed in a direction along the axis of the wire protection member 13. In such a wire protection tube provided with a slit, the cylindrical portion 513 formed integrally to cover all the large diameter portions 515 and the outer circumferential grooves 519 as in the background art protection tube 503 with a locking tool shown in FIG. 12 cannot be opened easily. On the other hand, the annular portions 15 of the connection member 17 according to the first embodiment are formed in only the outer circumferential grooves 23 of the wire protection tube 13 by molding. Thus, the slit 26 can be opened easily in comparison with the cylindrical portion 513 in the background-art protection tube 503 with a locking tool. Accordingly, due to the annular portions 15 of the connection member 17, the rigidity can be enhanced to prevent the wire protection tube 13 from being crushed easily while there is no fear that the workability with which electric wires are inserted through the slit 26 may be lost.

In addition, in the wire protection member 11 according to the first embodiment, a plurality of annular portions 15 may be formed in at least alternate ones of the outer circumferential grooves 23 by molding. In this case, a small diameter portion 21 is further disposed between adjacent ones of the annular portions 15 so as to be put between a pair of large diameter portions 19. Accordingly, the small diameter portions 21 can also undergo tensile or compressive deformation in addition to the aforementioned tensile or compressive deformation of the large diameter portions 19. As a result, the wire protection tube 13 can obtain higher flexibility in comparison with the case in which annular portions 15 are formed by molding in all the outer circumferential grooves 23 of the region where the annular portions are formed. In addition, since the number of annular portions 15 is reduced, the wire protection member 11 can be made light in weight.

Further, in the wire protection member 11 according to the first embodiment, a locking tool 31 to be locked to a mounting hole of a vehicle body panel is formed integrally with the connection portion 18 of the connection member 17 connecting the plurality of annular portions 15. The locking tool 31 is provided to protrude from the connection portion 18 on the opposite side to the wire protection tube 13, and locked to the mounting hole of the vehicle body panel. Thus, a bundle of electric wires inserted into the wire protection tube 13 can be supported on the vehicle body panel. On this occasion, the wire protection tube 13 is circumferentially surrounded by the annular portions 15 attached fixedly and integrally with the plurality of outer circumferential grooves 23. As a result, the annular portions 15 serve as a shell to prevent the wire protection tube 13 from being crushed.

Figure 11A:
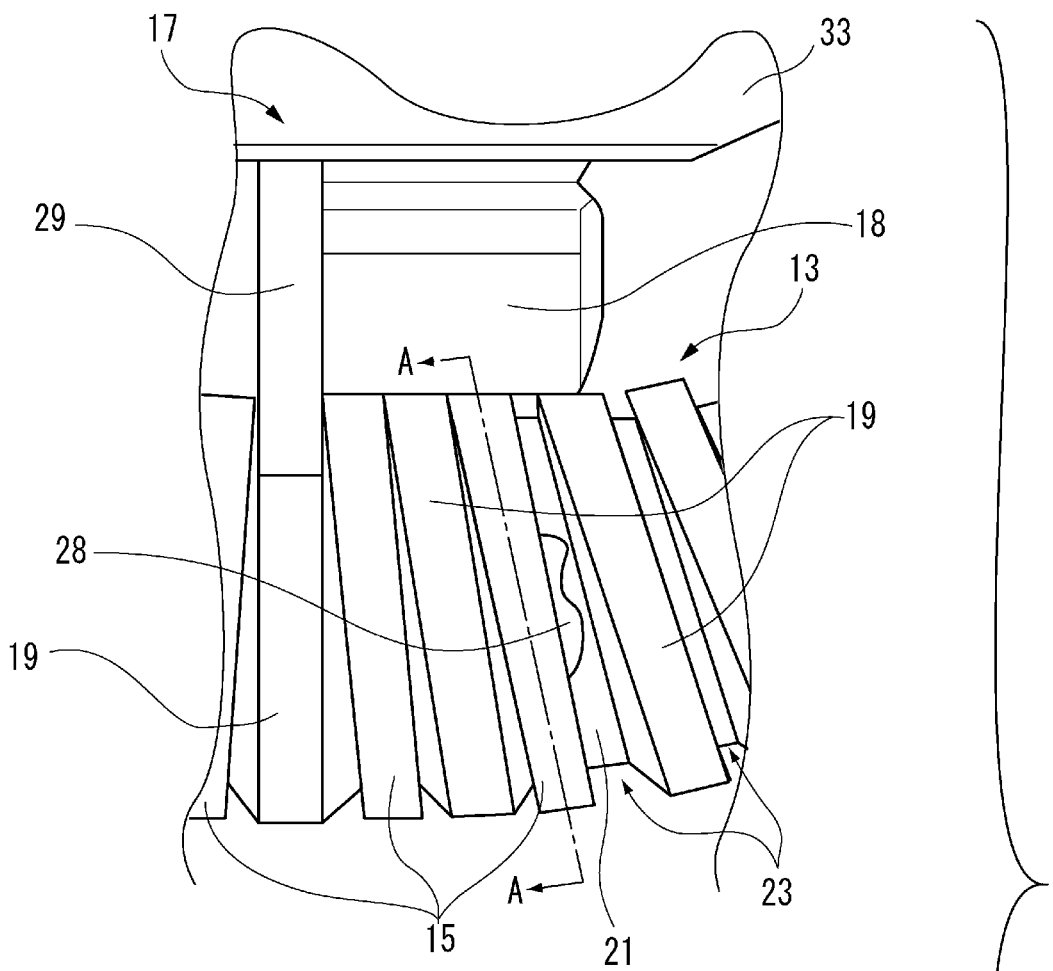
FIG. 11A is a view for explaining a procedure for visually checking the crushing condition of a small diameter portion in the wire protection tube in which annular portions of a connection member have been formed by molding.
Figure 11B:
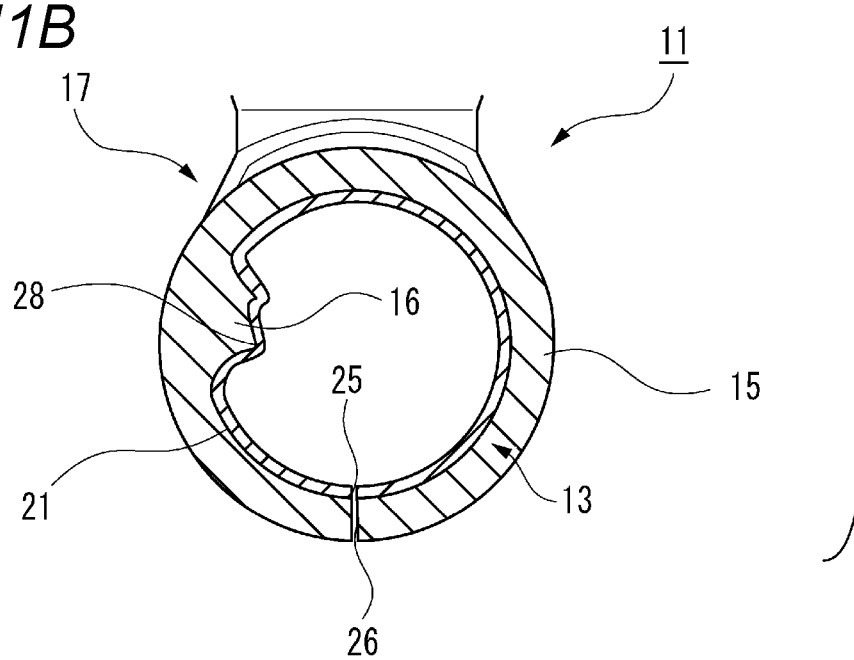
FIG. 11B is a sectional view taken on line A-A in FIG. 11A.

In addition, as shown in FIG. 11A, in the wire protection member 11 according to the first embodiment, the wire protection tube 13 is extended axially, and the annular portions 15 formed in the outer circumferential grooves 23 of the wire protection tube 13 by molding are separated from the small diameter portions 21 so that the small diameter portions 21 can be exposed to the outside. That is, as shown in FIG. 11B, a small diameter portion 21 of the wire protection tube 13 may be crushed by injection pressure of molten resin when the annular portions 15 of the connection member 17 are formed in the outer circumferential grooves 23 of the wire protection tube 13 by molding. In such a case, a recess portion 28 formed in the small diameter portion 21 by a bulging portion 16 of an annular portion 15 is exposed to the outside. Thus, the crushed condition of the small diameter portion 21 in the wire protection tube 13 can be visually checked after the connection member 17 has been formed by molding.

Thus, according to the wire protection member 11, 41 or 45 according to the aforementioned embodiments, the flexibility of the wire protection tube 13 can be kept without lowering the rigidity of the wire protection tube 13.

Here, the aforementioned features of the embodiments of the wire protection members according to the invention will be summarized and listed in the following items respectively.

[1] A wire protection member 11 including: a cylindrical wire protection tube 13 having flexibility, in which a plurality of large diameter portions 19 and a plurality of small diameter portions 21 are arranged alternately such that concave outer circumferential grooves 23 are formed between adjacent ones of the large diameter portions 19 across the corresponding small diameter portion 21; and a connection member 17 in which a connection portion 18 and a locking tool 31 are formed integrally, wherein the connection portion 18 connects a plurality of annular portions 15 formed in a plurality of the outer circumferential grooves 23 respectively by molding, and wherein the locking tool 31 is allowed to be locked to a mounting hole of a vehicle body panel.

[2] A wire protection member 11 according to the aforementioned item [1], wherein the plurality of annular portions 15 are formed in at least alternate ones of the outer circumferential grooves 23 by molding.

[3] A wire protection member 45 according to the aforementioned item [1] or [2], wherein an outer diameter of each of the annular portions 43 is smaller than an outer diameter of each of the large diameter portions 19.

[4] A wire protection member 11 according to any one of the aforementioned items [1] to [3], wherein slits 25 and 26 are formed in a direction along an axis of the wire protection tube 13 and axes of the annular portions 15 such that electric wires are inserted through the slits 25 and 26.

Incidentally, the invention is not limited to the aforementioned embodiments, but suitable deformations, improvements and so on may be made thereon. In addition, materials, shapes, dimensions, numbers, arrangement places, etc. of constituent elements in the aforementioned embodiments are not limited but may be selected desirably if the invention can be attained.

According to a wire protection member of the present invention, it is possible to provide a wire protection member capable of keeping flexibility of a wire protection tube without lowering rigidity of the wire protection tube.

What is claimed is:

1. A wire protection member comprising:
a flexible cylindrical wire protection tube, in which a plurality of large diameter portions and a plurality of small diameter portions are arranged alternately such that concave outer circumferential grooves are formed between adjacent ones of the large diameter portions across the corresponding small diameter portion, the outer circumferential grooves being open in a direction away from a radial center of the cylindrical wire protection tube; and a connection member in which a connection portion and a locking tool are formed integrally, wherein the connection portion is at least partially formed of a plurality of annular portions, each of the annular portions being disposed in a respective groove of the outer circumferential grooves, wherein a first reinforcing rib is provided on a first side surface of the connection portion, and a second reinforcing rib is provided on a second side surface of the connection portion opposite to the first side surface, wherein lower ends of the first and second reinforcing ribs are attached to at least one of the large diameter portions of the flexible cylindrical wire protection tube, and
wherein a majority of each of the plurality of annular portions, in a circumferential direction of the annular portions, are separated from each of the other plurality of annular portions such that a majority of the large diameter portions are exposed between the annular portions.

2. The wire protection member according to claim 1, wherein the plurality of annular portions are formed in at least alternate ones of the outer circumferential grooves.

3. The wire protection member according to claim 1, wherein an outer diameter of each of the annular portions is smaller than an outer diameter of each of the large diameter portions.

4. The wire protection member according to claim 1, wherein a slit is formed in a direction along an axis of the wire protection tube and axes of the annular portions such that an electric wire is inserted through the slit.

* * * * *